(12) United States Patent
Woodhead et al.

(10) Patent No.: US 7,531,477 B2
(45) Date of Patent: May 12, 2009

(54) PROCESS FOR MAKING METAL OXIDE-COATED MICROPOROUS MATERIALS

(75) Inventors: James L. Woodhead, Banbury (GB); Stanislav M. Snaidr, Mississauga (CA)

(73) Assignees: Rothmans, Benson & Hedges Inc., North York, Ontario (CA); AMR International Corp., Bridgetown (BB)

( * ) Notice: Subject to any disclaimer, the term of this patent is extended or adjusted under 35 U.S.C. 154(b) by 351 days.

(21) Appl. No.: 11/094,303

(22) Filed: Mar. 31, 2005

(65) Prior Publication Data

US 2005/0170948 A1 Aug. 4, 2005

Related U.S. Application Data

(63) Continuation of application No. 10/242,675, filed on Sep. 13, 2002, now Pat. No. 6,908,874.

(60) Provisional application No. 60/318,878, filed on Sep. 14, 2001.

(51) Int. Cl.
*B01J 29/65* (2006.01)
*B01J 29/60* (2006.01)
*B01J 29/40* (2006.01)
*B01J 29/18* (2006.01)
*B01J 29/08* (2006.01)
*B01J 29/06* (2006.01)

(52) U.S. Cl. .................... 502/73; 502/302; 502/304
(58) Field of Classification Search ............... 502/64, 502/65, 73, 302, 304
See application file for complete search history.

(56) References Cited

U.S. PATENT DOCUMENTS

| | | | |
|---|---|---|---|
| 2,723,243 A | 11/1955 | Holden | |
| 2,755,207 A | 7/1956 | Frankenburg | |
| 3,013,982 A | 12/1961 | Breck et al. | |
| 3,013,987 A | 12/1961 | Caster et al. | |
| 3,140,253 A | 7/1964 | Plank et al. | |
| 3,193,493 A | 7/1965 | Bourguet et al. | |
| 3,251,365 A | 5/1966 | Keith, II et al. | |
| 3,266,973 A | 8/1966 | Crowley | |
| 3,355,317 A | 11/1967 | Keith, II et al. | |
| 3,395,096 A | 7/1968 | Gladrow et al. | |
| 3,572,348 A | 3/1971 | Norman et al. | |
| 3,703,901 A | 11/1972 | Norman et al. | |
| 4,125,591 A | 11/1978 | Lindsley | |
| 4,440,868 A | 4/1984 | Hettinger, Jr. et al. | |
| 4,457,833 A | 7/1984 | Zandona et al. | |
| 4,483,937 A | 11/1984 | Liu | |
| 4,499,318 A | 2/1985 | Liu | |
| 4,637,990 A | 1/1987 | Torobin | |
| 4,637,992 A | 1/1987 | Lewis et al. | |
| 4,793,980 A | 12/1988 | Torobin | |
| 4,900,712 A | 2/1990 | Bar-Ilan et al. | |
| 4,977,126 A | 12/1990 | Mauldin et al. | |
| 5,008,090 A | 4/1991 | Joy, III et al. | |
| 5,070,053 A | 12/1991 | Culross et al. | |
| 5,074,990 A | 12/1991 | Culross et al. | |
| 5,077,253 A | 12/1991 | Chu et al. | |
| 5,176,899 A | 1/1993 | Montgomery | |
| 5,200,382 A | 4/1993 | Cody et al. | |
| 5,232,889 A | 8/1993 | Blanchard et al. | |
| 5,281,445 A | 1/1994 | Khare | |
| 5,352,646 A | 10/1994 | Blanchard et al. | |
| 5,387,475 A | 2/1995 | Baresel et al. | |
| 5,431,887 A | 7/1995 | Bar-Ilan | |
| 5,556,819 A | 9/1996 | Bar-Ilan | |
| 5,733,837 A | 3/1998 | Nakatsuji et al. | |
| 5,804,526 A | 9/1998 | Satoh et al. | |
| 5,928,981 A | 7/1999 | Leyrer et al. | |
| 5,935,889 A | 8/1999 | Murrell et al. | |
| 6,040,265 A | 3/2000 | Nunan | |
| 6,090,743 A | 7/2000 | Chopin et al. | |
| 6,419,998 B1 | 7/2002 | McGrath | |
| 2002/0044901 A1 | 4/2002 | Wilson et al. | |

FOREIGN PATENT DOCUMENTS

| | | |
|---|---|---|
| CA | 2033291 | 11/1995 |
| EP | 0 469 513 | 2/1997 |
| JP | 10066882 | 10/1998 |
| WO | WO 94/22564 | 10/1994 |
| WO | WO 98/16125 | 4/1998 |
| WO | WO 02/24005 | 3/2002 |
| WO | WO 02/24006 | 3/2002 |

OTHER PUBLICATIONS

L. Cot et al., "Inorganic membranes and solid state sciences", Solid State Sciences, 2, pp. 313-314, dated (2000).
E.V. Rebrov et al., "The preparation of highly ordered single layer ZSM-5 coating on prefabricated stainless steel microchannels", Applied Catalysis A: General 206, pp. 125-143, dated (2001).

*Primary Examiner*—David M Brunsman
(74) *Attorney, Agent, or Firm*—Banner & Witcoff, Ltd.

(57) ABSTRACT

A process for making a catalytic rare earth metal oxide-coated microporous particulate material that has the rare earth metal oxide coated on outer surfaces of the microporous particulate material. The process comprises the steps of: i) combining an amount of a colloidal dispersion of rare earth metal oxide hydrate with a compatible microporous particulate material to form a slurry, the microporous particulate material having an average pore size less than the particle size of the colloidal dispersion, to position thereby, the colloidal dispersion on the outer surfaces of the microporous particulate material; and ii) heat treating the slurry to fix the rare earth metal oxide to the outer surfaces of the microporous particulate material.

20 Claims, No Drawings

PROCESS FOR MAKING METAL OXIDE-COATED MICROPOROUS MATERIALS

RELATED APPLICATIONS

This application is a continuation of U.S. Ser. No. 10/242,675 filed Sep. 13, 2002, now U.S. Pat. No. 6,908,874, which claims benefit of the Sep. 14, 2001 filing date of U.S. Provisional Application Ser. No. 60/318,878. The applications are hereby incorporated by reference.

FIELD OF THE INVENTION

The present invention relates generally to a process for making a catalytic metal oxide-coated microporous particulate material and related products.

BACKGROUND OF THE INVENTION

Porous particulate materials carrying catalytically active elements are known in the art. These materials are useful in many processes, such as treating petroleum cuts or treating effluents, e.g., catalytically converting the exhaust gases emanating from internal combustion engines.

The catalysts typically comprise a carrier produced by shaping a porous material such as alumina. Thus, the carrier may assume various shapes, such as spheres, cylindrical extrusions or extrusions having a polylobal cross-section or a cross-section of various shapes, such as a wheel.

The porous materials generally used are alumina, silica, zeolites or the like. These carriers generally have a large specific surface area, e.g., over 20 m$^2$/g, to provide a large surface area which is rendered catalytically active by depositing catalytically active elements thereon.

Various elements are, typically, impregnated into the porous material. For instance, U.S. Pat. No. 5,232,889 is directed to a catalyst prepared by impregnating a porous material, preferably alumina spheres, with a colloidal dispersion of a metal to be deposited. The colloidal dispersion must have a particulate size no greater than the pore size of the porous material. When the colloidal dispersion penetrates the pores of the carrier, the reactive surface locations of the carrier change the pH of the dispersion, causing the metal to be deposited within the porous material. U.S. Pat. No. 6,040,265 is also directed to impregnating a porous material, such as alumina or zeolites, with a solution of a primary metal acetate, at least one secondary metal acetate and an organic depositing reagent such as a soluble sugar, saccharides, polysaccharides, or derivations thereof, thereby forming an impregnated porous material. In addition, Canadian Patent 2,033,291 is directed to a catalyst for the conversion of nitrogen oxides in a high-temperature exhaust gas. The catalyst consists of a zeolite (the molar ratio of $SiO_2/Al_2O_3$ is >20) that contains 0.5-10 wt % cerium oxide. The catalyst can be prepared either by impregnating the zeolite with an aqueous solution of a nitrate, a halide or a sulfate of cerium, or it can be prepared by effecting ion exchange. The mixture is then dried and calcined at 300-600° C.

The prior art also shows that other elements may form an aggregation with porous material to produce a catalytic material. For instance, U.S. Pat. No. 5,804,526 is directed to an adsorbent that exhibits an excellent adsorption ability for nitrogen oxides. The adsorbent can be made up, for example, of an aggregate of cerium oxide and zeolite. The content of cerium oxide in the catalyst is in the range of 10% to 80% by weight based on the total equivalent zeolite and cerium oxide content. The adsorbent is made from a mixture of cerium oxide crystallite particles and zeolite particles of dealuminized ZSM-5 zeolite, wherein the cerium oxide crystallite particles are comprised of polycrystalline aggregates having an average crystalline grain size of less than 500 Å. As an aggregate, the cerium oxide crystallite particles are adjacent to surfaces of the zeolite particles.

There are several patents that disclose the use of a catalytic coating on a porous metallic, or similar, support for the abatement of gases. U.S. Pat. No. 4,900,712 relates to the adsorption of one or more catalytically active oxides onto high surface area alumina. The method of preparing the catalytic coating involves the use of a colloidal deposit approach to uniformly dope oxides on high surface area alumina. The colloidal dispersions are prepared by taking an aqueous solution of a metal nitrate salt and converting the metal nitrate salt to a metal oxide colloid with an ion-exchange resin. The colloidal dispersion of the oxide is slurried with alumina, wherein the colloidal oxide particles are adsorbed onto the alumina. In order to maintain the adherence of the catalytic coating on the support and to ensure maintenance of a high surface area on the catalyst the doping oxide was limited to less than about 20% by weight, based on the total equivalent alumina and doping oxide content.

U.S. Pat. Nos. 5,431,887 and 5,556,819 are directed to flame-arresting coated filters for use in catalytic broiler smoke abatement assemblies. The filter is coated with a slurry of alumina (zeolite may be used or a mixture of the two) and colloidally dispersed ceria; the ceria acting as a binder. The colloidal dispersion of ceria was made using high temperatures for extended periods of time, as described in the aforementioned U.S. Pat. No. 4,900,712.

There is, however, a need for a process that provides a stable free-flowing bulk catalytic metal oxide-coated microporous particulate material with a variety of loadings and obviates the shortcomings of the prior art.

SUMMARY OF THE INVENTION

The present invention provides an effective process for making a stable catalytic metal oxide-coated microporous particulate material for use in the treatment of a variety of gaseous and particulate emissions in different applications.

According to an aspect of the present invention, there is provided a process for making a catalytic rare earth metal oxide-coated microporous particulate material having greater than 20% by weight of the rare earth metal oxide coated on outer surfaces of the microporous particulate material, based on the total equivalent rare earth metal oxide and microporous particulate material content, the process comprising the steps of:

i) combining an amount of a colloidal dispersion of rare earth metal oxide hydrate with a compatible microporous particulate material to form a slurry, the amount of the colloidal dispersion being sufficient to provide, when heat treated as per step (ii), greater than 20% by weight of the rare earth metal oxide, the microporous particulate material having an average pore size of less than 20 Å and the colloidal dispersion having a particle size of at least 20 Å, to position thereby, the colloidal dispersion on the outer surfaces of the microporous particulate material; and ii) heat treating the slurry at a temperature below about 200° C., above about 400° C., or sequential combinations thereof wherein the slurry is heat treated, firstly, at temperatures below about 200° C. and secondly, above about 400° C., to fix the resultant rare earth metal oxide on the outer surfaces of the microporous particulate material, to provide a free flowing bulk particulate.

According to another aspect of the present invention, preferably the microporous particulate material is a compatible aluminosilicate. Most preferably, the microporous particulate material is a compatible zeolite.

According to another aspect of the present invention, preferably the rare earth metal oxide is selected from the group consisting of oxides of lanthanide metals, yttrium, scandium and a mixture thereof Most preferably, the rare earth metal oxide is an oxide of cerium.

In yet another aspect of the present invention, the colloidal dispersion is crystalline and has a pH of less than 4.2.

In still another aspect of the present invention, the process comprises a further step (iii) that includes milling said rare earth metal oxide coated zeolite particulate material to provide particle sizes in the range of 1 to 25 microns.

In yet another aspect of the present invention, the slurry is, preferably, heat treated using spray drying, tray drying, freeze drying, solvent drying, flash drying techniques or a mixture thereof.

In yet another aspect of the present invention, the colloidal dispersion is, preferably, dried to a gel and subsequently reconstituted in water to form the colloidal dispersion used in step (i).

According to another aspect of the present invention there is provided a process for making a catalytic rare earth metal oxide-coated zeolite particulate material having at least 1.0% by weight of said rare earth metal oxide coated on outer surfaces of said zeolite particulate material, based on the total equivalent rare earth metal oxide and zeolite content, said process comprising the steps of:

i) combining an amount of a colloidal dispersion of rare earth metal oxide hydrate with a compatible zeolite particulate material to form a slurry, the amount of the colloidal dispersion being sufficient to provide, when heat treated as per step (ii), at least 1.0% by weight of the rare earth metal oxide, said zeolite particulate material having an average pore size of less than 20 Å and said colloidal dispersion having a particle size of at least 20 Å, to position thereby, said colloidal dispersion on said outer surfaces of said zeolite; and ii) heat treating said slurry at a temperature below about 200° C. to fix the resultant rare earth metal oxide on said outer surfaces of said zeolite particulate material, to provide a free flowing bulk particulate.

According to yet another aspect of the present invention, there is provided a process for making a catalytic rare earth metal oxide-coated zeolite particulate material having at least 1% by weight of said rare earth metal oxide coated on outer surfaces of said zeolite particulate material, based on the total equivalent rare earth metal oxide and zeolite content, said process comprising the steps of:

i) combining an amount of a colloidal dispersion of rare earth metal oxide hydrate with a compatible zeolite particulate material to form a slurry, the amount of the colloidal dispersion being sufficient to provide, when heat treated as per step (ii), greater than 1.0% by weight of the rare earth metal oxide, said zeolite particulate material having an average pore size of less than about 20 Å and said colloidal dispersion having a particle size of at least about 20 Å, to position thereby, said colloidal dispersion on said outer surfaces of said zeolite; and ii) heat treating said slurry at a temperature below about 200° C., above about 400° C. to about less than 550° C., or sequential combinations thereof wherein said slurry is heat treated, firstly, at temperatures below about 200° C. and secondly, above about 400° C. but less than 550° C., to fix the resultant rare earth metal oxide on said outer surfaces of said zeolite particulate material, to provide a free flowing bulk particulate.

According to yet another aspect of the present invention, there is provided a process for making a catalytic cerium oxide-coated zeolite particulate material having at least 1% by weight of said cerium oxide coated on outer surfaces of said zeolite particulate material, based on the total equivalent cerium oxide and zeolite content, said process comprising the steps of:

i) combining an amount of a colloidal dispersion of cerium oxide hydrate with a compatible zeolite particulate material to form a slurry, the amount of the colloidal dispersion being sufficient to provide, when heat treated as per step (ii), greater than 1.0% by weight of the cerium oxide, said zeolite particulate material having an average pore size of less than about 20 Å and said colloidal dispersion having a particle size of at least about 20 Å, to position thereby, said colloidal dispersion on said outer surfaces of said zeolite; and ii) heat treating said slurry at a temperature below about 200° C., above about 400° C. to about less than 550° C., or sequential combinations thereof wherein said slurry is heat treated, firstly, at temperatures below about 200° C. and secondly, above about 400° C. but less than 550° C., to fix the resultant cerium oxide on said outer surfaces of said zeolite particulate material, to provide a free flowing bulk particulate.

Yet, in still a further aspect of the present invention there is provided a process for making a catalytic rare earth metal oxide-coated zeolite particulate material having at least 1% by weight of said rare earth metal oxide coated on outer surfaces of said zeolite particulate material, based on the total equivalent rare earth metal oxide and zeolite content, said process comprising the steps of:

i) combining an amount of a colloidal dispersion of rare earth metal oxide hydrate with a compatible zeolite particulate material having a pH of less than about 4.2 to form a slurry, the amount of the colloidal dispersion being sufficient to provide, when heat treated as per step (ii), greater than about 1.0% by weight of the rare earth metal oxide, said zeolite particulate material having an average pore size of less than about 20 Å and said colloidal dispersion having a particle size of at least about 20 Å, to position thereby, said colloidal dispersion on said outer surfaces of said zeolite; and ii) heat treating said slurry at a temperature below about 200° C., above about 400° C., or sequential combinations thereof wherein said slurry is heat treated, firstly, at temperatures below about 200° C. and secondly, above about 400° C., to fix the resultant rare earth metal oxide on said outer surfaces of said zeolite particulate material, to provide a free flowing bulk particulate.

In yet another aspect of the present invention, the rare earth metal oxide coated on the outer surface is in the range of about 1.0 to 75%, preferably, in the range of about 20 to 70% by weight based on the total equivalent rare earth metal oxide and zeolite content.

In still another aspect of the present invention, the colloidal dispersion is prepared to a predetermined controlled range of colloidal particle sizes of 20 to 50 Å, 50 to 70 Å or 100 to 150 Å.

In yet another aspect of the present invention, wherein preparation of the colloidal dispersion, having a predetermined particle size of about 20 to 50 Å, comprises the steps of:

a) mixing a base and hydrogen peroxide with a hydrolyzable rare earth metal salt solution, yielding a rare earth metal hydroxide solution; and b) adding a strong acid to the rare earth metal hydroxide solution to provide the colloidal dispersion of rare earth metal oxide hydrate, wherein the strong acid is capable of deaggregating the colloidal dispersion of rare earth metal oxide hydrate.

In yet another aspect of the present invention, wherein preparation of the colloidal dispersion, having the predetermined particle size of 50 to 70 Å, comprises the steps of:

a) mixing a base with a hydrolyzable rare earth metal salt solution, whereby air is bubbled into the solution, yielding a rare earth metal hydroxide solution; and b) adding a strong acid to the rare earth metal hydroxide solution to provide the colloidal dispersion of rare earth metal oxide hydrate, wherein the strong acid is capable of deaggregating the colloidal dispersion of rare earth metal oxide hydrate.

In yet another aspect of the present invention, wherein preparation of the colloidal dispersion, having the predetermined particle size of 100 to 150 Å, comprises the steps of:

a) mixing a base with a hydrolyzable rare earth metal salt solution, in which the rare earth metal has two oxidation states;

b) allowing the hydrolyzable rare earth metal salt solution to slowly oxidize in air to yield a rare earth metal hydroxide solution; and c) adding a strong acid to the rare earth metal hydroxide solution to provide the colloidal dispersion of rare earth metal oxide hydrate, wherein the strong acid is capable of deaggregating the colloidal dispersion of rare earth metal oxide hydrate.

According to another aspect of the present invention, there is provided a catalytic rare earth metal oxide-coated zeolite free-flowing bulk particulate comprising:

a zeolite particulate material;

a rare earth metal oxide;

said zeolite particulate material having an average pore size of less than 20 Å; and greater than 20% by weight of said rare earth metal oxide coated on outer surfaces of said zeolite particulate material, based on the total equivalent rare earth metal oxide and zeolite content.

In yet another aspect of the present invention, typically, less than 30% by weight of the rare earth metal oxide (based on the total equivalent rare earth metal oxide content) is found to leach into water when the rare earth metal oxide-coated zeolite free-flowing bulk particulate is slurried in water.

According to yet another aspect of the present invention, there is provided a process for making a catalytic rare earth metal oxide-coated microporous particulate material having the rare earth metal oxide coated on outer surfaces of said microporous particulate material, said process comprising the steps of:

i) combining an amount of a colloidal dispersion of rare earth metal oxide hydrate with a compatible microporous particulate material to form a slurry, said microporous particulate material having an average pore size less than the particle size of said colloidal dispersion, to position thereby said colloidal dispersion on the outer surfaces of said microporous particulate material; and ii) heat treating said slurry to fix the rare earth metal oxide to the outer surfaces of the microporous particulate material.

In one embodiment, said heat treating comprises heating said slurry at a temperature sufficient to drive off sufficient water from said slurry, to form a free flowing bulk particulate. Preferably, said heat treating further comprises calcining said free flowing bulk particulate.

In another embodiment, said heat treating comprises heating said slurry to dry, calcined powder in a single step.

In another embodiment, said slurry comprises nitrate ions and during said heat treating is conducted at a temperature sufficient to decompose at least some of the nitrate ions to gaseous components.

In another embodiment, said process further comprises milling said rare earth metal oxide coated microporous particulate material to provide particle sizes in the range of 1 to 25 microns. It should be noted that other particle size ranges might be utilized. In particular, smaller particles could be made by milling, e.g. 0.5 to 1 micron particles. The particle size that is selected is based on the use that is to be made of the coated microporous particulate material and the ability to handle to milled particles.

DETAILED DESCRIPTION OF THE PREFERRED EMBODIMENTS

Accordingly, the present invention relates to a novel process that provides a free-flowing bulk catalytic rare earth metal oxide-coated compatible microporous particulate material. Preferably, the compatible microporous material is a compatible aluminosilicate, such as a compatible zeolite particulate material.

In the present invention, rare earth metals are defined as scandium, yttrium and the lanthanide metals.

In one embodiment of the present invention, the process for making the catalytic rare earth metal oxide-coated microporous particulate material comprises the steps of:

i) combining an amount of colloidal dispersion of rare earth metal oxide hydrate with a compatible microporous particulate material to form a slurry, such that the amount of the colloidal dispersion is sufficient to provide, when heat treated as per step (ii), a particular percent by weight of the rare earth metal oxide and ii) heat treating the slurry to fix the resultant rare earth metal oxide on the outer surfaces of the microporous particulate material, and a free flowing bulk particulate results.

A compatible microporous material is defined as one that maintains compatibility with the colloidal dispersion so that the colloidal dispersion remains intact (i.e. that the particulate material remains in a substantially dispersed form). If the colloidal dispersion flocculates to a substantial degree before drying, then the slurry will not result in the formation of a free flowing powder upon the slurry being dried (such as in a spray drier) and the product may not be homogeneous. Accordingly, the microporous material is selected such as not to cause any substantial flocculation, of the colloidal particles in the dispersion, and preferably no or essentially no flocculation, of the colloidal particles in the dispersion. Some factors that determine the compatibility of the microporous material and the colloidal dispersion, include, but are not limited to: the pH of the microporous material and the presence of ionizable salts such as ammonium nitrate. If the pH is too high, then the colloids will flocculate. In such a case, by lowering the pH, the colloids may be dispersed in the fluid..

Preferably, the compatible microporous particulate material is a compatible aluminosilicate and more preferably, a compatible zeolite particulate material. The compatible zeolite particulate material that may be used in the present invention includes, but is not limited to, silicalite zeolites, X, Y and L zeolites, faujasites ($(Na_2, Ca, Mg)_{29}[Al_{58}Si_{134}O_{384}].240\ H_2O$; cubic), β-zeolites ($Na_n[Al_nSi_{64-n}O_{128}]$ with n<7; tetragonal), Mordenite zeolites ($Na_8[Al_8Si_{40}O_{96}].24\ H_2O$; orthorhombic), ZSM zeolites ($Na_n[Al_nSi_{96-n}O_{192}]\sim16\ H_2O$ with n<27; orthorhombic),and mixtures thereof Preferably, the zeolites are hydrophobic, mildly hydrophobic zeolites or mixtures thereof, which have an affinity for hydrophobic and mildly hydrophobic organic compounds. Zeolites having a pH of less than 4.2 are also highly preferred to maintain compatibility with the colloidal dispersion. Zeolites having higher pH's may be used, whereby the zeolite is mixed with water and an acid is added to lower the pH to the desired pH level.

The zeolite materials used may also be characterized by the following formula:

$$M_m M'_n M''_p [aAlO_2 \cdot b\ SiO_2 \cdot cTO_2]$$

wherein

M is a monovalent cation,

M' is a divalent cation,

M" is a trivalent cation, a, b, c, n, m, and p are numbers which reflect the stoichiometric proportions, c, m, n or p can also be zero, Al and Si are tetrahedrally coordinated Al and Si atoms, and T is a tetrahedrally coordinated metal atom being able to replace Al or Si, the ratio of b/a of the zeolite, or the zeolite-like material, has a value of about 5 to about 300 and the micropore size of the zeolite is within the range of 5 to 13 Å.

Preferably, the rare earth metal oxide used is an oxide of a lanthanide metal, yttrium, scandium or a mixture thereof. More preferably, the rare earth metal oxide is an oxide of cerium.

The rare earth metal colloidal dispersions useful for the present invention are made from, but are not limited to, the following rare earth metal salts: $YCl_3$, $Y_2(CO_3)_3$, $Y(C_2H_3O_2)_3$, $Y(NO_3)_3$, $CeCl_3$, $Ce_2(CO_3)_3$, $Ce(C_2H_3O_2)_3$, $Ce(ClO_4)_3$, and $Ce(NO_3)_3$. Preferably, the rare earth metal colloidal dispersion is prepared to a predetermined particle size ranging from 20 to 150□. In general, the colloidal dispersion is made by mixing an aqueous slurry of the rare earth metal salt with an acid to yield a hydrolyzable salt. The preferred acids are nitric acid or hydrochloric acid. Alternatively, if the initial metal salt is a nitrate or a chloride, this step of mixing the nitrate or chloride salt with acid is unnecessary. By either approach, the resulting hydrolyzable salt, such as metal nitrate or metal chloride, is hydrolyzed. Preferably, it is hydrolyzed and oxidized by adding a mixture of ammonium hydroxide and hydrogen peroxide. A metal hydroxide is obtained and admixed with water and a strong acid to yield a slurry. The strong acid may be, for example, nitric acid, hydrochloric acid or perchloric acid, and is capable of deaggregating the resulting insoluble metal hydrate. A residue from the slurry is then admixed with water to give the metal oxide colloidal dispersion. When nitric acid is used as the strong acid, the mole ratio of nitrate ions to rare earth metal oxide in said colloidal dispersion is in the range of 0.1 to 1.0; preferably, 0.1 to 0.5, and most preferably, 0.12 to 0.25.

In embodiments, the colloidal dispersion may be prepared to a predetermined particle size range of 20 to 150□. The particle size is controlled by the precipitation and oxidation parameters used for formation of the colloidal dispersion. In particular embodiments, a base and, optionally, hydrogen peroxide are added to oxidize a hydrolyzable rare earth metal salt solution to yield a rare earth metal hydrate dispersion, and depending on:

(i) whether the reaction is done under hot or cold conditions, (ii) whether the reaction is purged with air, (iii) how concentrated the solution containing the rare earth metal hydrate is, (iv) whether the base is added to the salt or vice-versa; the crystallite size may be varied from 20 to 100□. In other particular embodiments, to make larger particles such as 100 to 150□, the base is added to a hydrolyzable rare earth metal salt solution and allowed to slowly oxidize in air.

In one embodiment, the colloidal dispersion is prepared to a predetermined particle size range of 20 to 50□. Ammonium hydroxide and hydrogen peroxide are mixed with a cerium nitrate solution, forming a cerium hydroxide solution. Nitric acid is then added to the cerium (IV) hydroxide solution and a colloidal dispersion of 20 to 50□ cerium oxide hydrate particles and nitrate ions result. Preferably, the mole ratio of nitrate ions to cerium oxide in said colloidal dispersion is in the range of 0.12 to 0.25. Other embodiments are feasible, wherein any suitable hydrolysable rare earth metal salt or mixtures thereof may be substituted, any suitable strong acids capable of deaggregating the resulting insoluble rare earth metal hydrate such as hydrochloric acid or perchloric acid, may be substituted, and any suitable base such as sodium hydroxide, potassium hydroxide, tetraethyl ammonium hydroxide may be substituted. Preferably, the base has a pH greater than 4. More preferably, the base is selected from the group consisting of ammonium hydroxide and derivatives thereof. When sodium or potassium hydroxide is used as the base, the sodium and potassium are difficult to remove from the precipitated hydrate particles. Several washings of the particles are therefore required.

In another embodiment, ammonium hydroxide is mixed with a cerium nitrate solution, wherein the mixture is purged with air, e.g. air is bubbled into the mixture. A cerium (IV) hydroxide solution results and nitric acid is then added and a colloidal dispersion of 50 to 70□ cerium oxide hydrate particles and nitrate ions are formed. Preferably, the mole ratio of nitrate ions to cerium oxide in said colloidal dispersion is in the range of 0.12 to 0.25. Other embodiments are feasible, wherein any suitable hydrolysable rare earth metal salt or mixtures thereof, any suitable strong acids and any suitable base, as mentioned above, may be substituted.

In another embodiment, ammonium hydroxide is mixed with a cerium nitrate solution, wherein the mixture is slowly oxidized in air, for example, allowed to sit at room temperature for a few days, to yield a cerium (IV) hydroxide solution. Nitric acid is then added to the solution and a colloidal dispersion of 100 to 150□ cerium oxide hydrate particles and nitrate ions result. Preferably, the mole ratio of nitrate ions to cerium oxide in said colloidal dispersion is in the range of 0.12 to 0.25. Other embodiments are feasible, wherein any suitable hydrolysable rare earth metal salt or mixtures thereof, any suitable strong acids and any suitable base, as mentioned above, may be substituted.

Cerous and/or ceric salts can be converted into cerium (IV) colloids relatively easily. In another embodiment, the dispersion is made by admixing an aqueous slurry of cerium carbonate with nitric acid. The resulting cerium nitrate is hydrolyzed and oxidized through the addition of a mixture of ammonium hydroxide and hydrogen peroxide. Cerium hydroxide is obtained and admixed with water and nitric acid to yield the cerium colloidal dispersion, which comprises cerium oxide hydrate particles and nitrate ions. The cerium colloidal dispersion is then added to a compatible zeolite to form a slurry, which is heat treated at a temperature as described above to give the free-flowing particulate.

In general, the slurry of the colloidal dispersion of rare earth metal oxide hydrate and compatible microporous particulate material is quite stable. It has been found that the slurry is stable to coagulation and chemical changes, such as chemical reactions, dissolution, pH changes and conductance changes.

The microporous particulate material has an average pore size that is less than the average particle size of the colloidal dispersion so that the colloidal dispersion can be positioned on the outer surfaces of the material. Preferably, the material has an average pore size that is less than about 20 Å and the colloidal dispersion has a particle size of at least about 20 Å. More preferably, the material has an average pore size that is less than about 10 Å.

Preferably, there is greater than 20% by weight of the rare earth metal oxide (based on the total equivalent microporous particulate material and rare earth metal oxide content) coated on the outer surfaces of the microporous particulate material. High loadings of the rare earth metal oxide coated on the outer surface is provided, preferably, in the range of from about 20 to about 70% by weight based on the total equivalent rare earth metal oxide and microporous particulate material content. The free flowing particulate, that is the microporous particulate material having high loadings of rare earth metal oxide, is, surprisingly, quite stable.

The stability of the free flowing particulate is measured by the leachability of the rare earth metal oxide-coated microporous particulate material; low leachability is equated to a stable particulate material. The leachability is determined by the amount of rare earth metal oxide that dissolves (leaches) into water when the rare earth metal oxide-coated microporous particulate material is slurried in water.

The rare earth metal oxide-coated microporous particulate material may be heat treated at a variety of temperatures and combinations of temperatures while still maintaining its stability. In particular embodiments, when a rare earth metal oxide-coated microporous particulate material is heat treated at temperatures less than about 200° C. and slurried in water, surprisingly, very little rare earth metal oxide is leachable. Since the material was heat treated at such low temperatures, it was expected that the rare earth metal oxide would completely leach into the water. It was found, however, that, typically, less than 30% by weight of the rare earth metal oxide (based on the total equivalent rare earth metal oxide content) leached into water, which shows that the particulate material is quite stable even when heat treated at temperatures less than about 200° C. When the rare earth metal oxide-coated microporous particulate material is heat treated at temperatures greater than about 400° C. and slurried in water, usually less than 0.1% by weight of the rare earth metal oxide (based on the total equivalent rare earth metal oxide content) is found to leach into water. These results are true for both high and low loadings. Unlike the approach of the prior art, the present approach works well to provide a variety of loadings including high loadings (greater than about 20% by weight of the rare earth metal oxide) using a variety of temperatures up to about 900° C., including sequential temperatures, without destroying the high surface area or catalytic activity of the material.

In preferred embodiments, the resulting slurry of the process of the present invention may be heat treated at temperatures below about 200° C., above about 400° C. or sequential combinations thereof wherein the slurry is heat treated, firstly, at temperatures below about 200° C. and secondly, above about 400° C. Preferably, the slurry is heat treated at a temperature below about 200° C. and then subsequently at a temperature above about 400° C. More preferably, the slurry is heat treated at a temperature of from about 85° C. to about 105° C. and then subsequently at a temperature above about 400° C., wherein the slurry is heated at a rate of 100° C./hour until it reaches a temperature above about 400° C. At this point, the temperature is held for at least 1 hour. Deleterious results occur to the rare earth metal oxide-coated microporous particulate material if it is heat treated only at a temperature between about 200° C. and about 400° C. for a commercially feasible period of time, normally, 5 hours. Although it is possible to heat the rare earth metal oxide-coated microporous particulate material at a temperature between about 200° C. and about 400° C. for several weeks such that no deleterious results occur, this would not be practical for the manufacture of the rare earth metal oxide-coated microporous particulate material.

Without being bound to any particular theory, it is thought that when the colloidal dispersion of rare earth metal oxide hydrate is combined with a compatible microporous material to form a slurry, the counter ions of the strong acid used in making the colloidal dispersion (e.g. nitrate ions) migrate into the pores of the microporous material and the rare earth metal oxide is fixed to the outer surfaces of the microporous material such that the rare earth metal oxide is no longer water dispersible. It is thought that when the drying step is done at lower temperatures, i.e. below about 200° C., it enhances fixing of the rare earth metal oxide to the outer surfaces of the microporous material and the rare earth metal oxide-coated microporous particulate material is insoluble in water. If, however, the drying step occurs between about 200° C. and about 400° C. for a commercially feasible period of time, normally 5 hours, the counter ions are thought to be released from the pores of the microporous material and are available to recombine with the rare earth metal oxide component to reform water dispersible rare earth metal oxide. Overall, this would destroy the rare earth metal oxide-coated microporous particulate material if it were dissolved in water. In other words, the rare earth metal oxide would leach into the water destroying the rare earth metal oxide-coated microporous particulate matter. When heating is continued to above about 400° C., it is thought that the counter ions decompose to gaseous components, which are released from the pores of the rare earth metal oxide-coated microporous particulate material so that the material remains insoluble in water.

Accordingly, in one embodiment, the slurry is heat treated to fix the rare earth metal oxide to the outer surfaces of the microporous material. The fixing heat treatment step may comprise a drying step and/or a calcining step.

In the drying step, the slurry is preferably heated at a temperature and for a period of time sufficient to form a dry powder (i.e. to drive off at least some, and more preferably all or essentially all, of the water from the slurry). Preferably, the solution is dried (such as by a spray drier) at a temperature below about 200° C. In most cases, the drying step includes either spray drying, tray drying, freeze drying, solvent drying or flash drying techniques or combinations thereof.

In the calcining step, the slurry or a dried powder is preferably heated at a temperature and for a period of time sufficient to remove or decompose at least some of the counter ions, and more preferably all or essentially all of the counter ions., from the resultant dried microporous material. During this process, remaining water (if the slurry was not already subjected to an initial low temperature drying process) is driven off and at least some of the counter ions are decomposed, and more preferably all or essentially all of the counter ions are decomposed, to gaseous components. Preferably, the solution is spray dried and calcined in a single process step, such as in a spray calciner. However, this may heat treatment may be performed in two steps, such as initial drying step (e.g. by means of a spray drier) followed by the calcining step.

In another embodiment, the preferred rare earth metal used in the aforementioned process is cerium and the preferred compatible microporous material is a compatible zeolite particulate material. There may be greater than about 1% by weight, based on the total equivalent zeolite and cerium oxide content, of the cerium oxide coated on the outer surfaces of the zeolite particulate material. High loadings of the cerium oxide coated on the outer surface is provided, typically, in the range of from about 20 to about 70% by weight based on the total equivalent cerium oxide and zeolite content. The zeolite particulate material, having high loadings of cerium oxide, are, surprisingly, quite stable. When the cerium oxide-coated zeolite particulate material is heat treated at temperatures less than about 200° C. and slurried in water, surprisingly, very little cerium oxide is leachable. Typically, less than 30% by weight of the cerium oxide (based on the total equivalent cerium oxide content) is found to leach into water, which shows that the particulate material is quite stable even when heat treated at temperatures less than about 200° C. When the cerium oxide-coated zeolite particulate material is heat treated at temperatures greater than about 400° C. and slurried in water, usually less than 0.1% by weight of the cerium oxide (based on the total equivalent cerium oxide content) is found to leach into water.

The slurry is preferably spray dried at a temperature below about 200° C. In most cases, the heat treating step includes either spray drying, tray drying, freeze drying, solvent drying or flash drying techniques or combinations thereof.

The zeolite particulate material has an average pore size that is less than the average particle size of the colloidal dispersion of cerium oxide hydrate so that the colloidal dispersion can be positioned on the outer surfaces of the zeolite. Preferably, the zeolite has an average pore size that is less than 20 Å and the ceria colloidal dispersion has a particle size of at least 20 Å.

In a preferred embodiment, the aforementioned process incorporates an additional step (iii) of milling the bulk particulate to provide a particle size in the range of 1 to 25 microns.

The catalytic rare earth metal oxide-coated microporous particulate materials can be used in a variety of different applications. In one aspect of the invention, the metal oxide-coated microporous particulate materials can be incorporated into the cigarette paper enclosing a conventional tobacco rod to reduce side stream smoke emissions. Specifically, the particulate material can be used as a filler in the manufacture of cigarette paper, impregnated in a cigarette paper, or applied as a coating(s) or a layer(s) on the exterior and/or interior surface of a cigarette paper. Alternatively, the treated paper could be used as a multiple wrap; that is, the treated paper may be applied as an outer wrap over a cigarette having conventional cigarette paper.

In another aspect of the invention, the particulate material can be used to catalyze exhaust gases from the combustion of a fuel, such as automobile exhaust fumes. A modern automobile engine produces many pollutants caused by the incomplete combustion of hydrocarbon fuels. Exhaust gas mixtures typically contain CO, unburned hydrocarbons, and several thousand ppm NOx. Catalytic converters that reduce these three by products of combustion are referred to as three-way catalysts. Other uses include a coating on the inner walls of self-cleaning ovens, catalytic cracking, thermal sprayed coatings and abradable seals.

A catalyst, such as cerium oxide, has the ability to provide oxygen for completing hydrocarbon and CO oxidation during periods when the engine is running rich. When the engine is running lean, cerium is oxidized to $Ce^{4+}$ which stores oxygen. When the fuel-rich cycle begins, cerium is able to change oxidation states reversibly from $Ce^{4+}$ to $Ce^{3+}$, providing oxygen for chemical reactions (e.g. converting CO to $CO_2$). For the catalyst to be able to work effectively under the high temperatures that exist in a tail pipe, it must have sufficient surface area to provide enough active sites for catalytic reactions. The ceria-coated microporous particulate materials made in accordance with the present invention provide a high catalytic surface area to effect sufficient catalysis of the pollutants. Additionally, the ceria is stabilized by the microporous particulate materials to enable the oxide to withstand the high temperatures in the tail pipe.

The following Examples are being submitted to further illustrate various aspects of the present invention. These Examples are intended to be illustrative only and are not intended to limit the scope of the present invention.

EXAMPLES

Ceria Colloidal Dispersions

Example 1

Cerium carbonate (50 g, 99.9% purity) containing 69.3% by weight cerium oxide equivalent was slurried with distilled water (0.1 L) and dissolved by adding nitric acid (38.4 ml; 16 M). The resulting neutral solution was boiled for a few minutes, filtered to remove traces of insoluble matter, and diluted to 1 L with water to give a cerous nitrate solution. A mixture comprising ammonium hydroxide (40 ml, 18 M), hydrogen peroxide (20 ml, "100 volume") and water (160 ml) was added with stirring to the cerous nitrate solution prepared and maintained at 75° C. The resulting insoluble, dark brown cerium (IV) peroxide complex rapidly faded in colour and after the complete addition of the ammonium hydroxide/hydrogen peroxide mixture, a creamy-white precipitate of cerium (IV) hydroxide was obtained, having a pH of 7.0.

The precipitate was centrifuged and washed twice by stirring with successive 1 L volumes of distilled water. The separated precipitate was stirred with distilled water (750 ml) and nitric acid (12.5 ml of 16 M) to give a nitric acid/ cerium oxide mole ratio of 1. The resulting slurry was heated to about 70° C. for 15 minutes to deaggregate the cerium (IV) hydroxide and give a conditioned slurry. The pH of the conditioned slurry was less than 1.

After cooling, the slurry was centrifuged and the residue was dispersed in distilled water (150 ml) to give a semi-transparent greenish colloidal sol.

Example 2

1 kg of cerium (IV) oxide hydrate (approximately 72% cerium oxide and with a nitrate/cerium oxide ratio of 0.24) was placed in a saggar (bed-depth 3.0 cm) and heated for 1 hour in a muffle furnace at 320° C. in air. The resulting dry dispersible cerium compound powder (0.78 kg) had a crystallite size of 59 Å and the nitrate/cerium ratio was 0.14.

100 g of the heat-treated cerium compound powder was dispersed by stirring in hot demineralized water to form a colloidal dispersion with a concentration of μ 450 g/L cerium oxide equivalent.

Example 3

1.22 kg of a dispersible ceria gel (obtained from Advanced Materials Resources, Inc. of Toronto, Canada and made by the process as described in Example 1) was stirred for 30 minutes with 5.5 L of demineralized water. The resultant colloidal dispersion contained 200 g/L of cerium oxide. The colloidal dispersion has a density of 1.15 g/ml and a pH of 1.8.

Mixed Ceria Colloidal Dispersion-Zeolite Slurries

Example 4A 0.536 kg of a zeolite powder (Zeolyst™ CBV 400 obtained from Zeolyst International of Pennsylvania, USA; pH 3 to 5) was added with stirring to 2.0 L of the cerium oxide colloidal dispersion (180 g/L of cerium oxide equivalent), made as described in Example 3. The thixotropic mixture (density 1.30 g/ml, pH 3.8) containing a nominal 44% by weight cerium oxide (based on the total equivalent cerium oxide and zeolite content) and 56% by weight zeolite (based on the total equivalent cerium oxide and zeolite content) was spray dried (an inlet temperature of 180° C. and an outlet temperature of 105° C.) to yield a free flowing gel powder.

Example 4B 45 g of a zeolite powder (Zeolyst™ CBV 400 obtained from Zeolyst International; pH 3 to 5) was added with stirring to 0.5 L of the cerium oxide colloidal dispersion (100 g/L of cerium oxide equivalent), made as described in Example 3. The thixotropic mixture (density 1.20 g/ml, pH 2.8) containing a nominal 72% by weight cerium oxide (based on the total equivalent cerium oxide and zeolite content) and 28% by weight zeolite (based on the total equivalent cerium oxide and zeolite content) was spray dried (an inlet temperature of 180° C. and an outlet temperature of 105° C.) to yield a free flowing gel powder.

Example 5

0.59 kg of a zeolite powder (Zeolyst™ CBV 600 obtained from Zeolyst International; pH 3 to 5) was added with stirring to 2.0 L of the cerium oxide colloidal dispersion (180 g/L of cerium oxide equivalent), made as described in Example 3. The thixotropic mixture (density 1.28 g/ml, pH 3.3) containing a nominal 44% by weight cerium oxide (based on the total equivalent cerium oxide and zeolite content) and 56% by weight zeolite (based on the total equivalent cerium oxide and zeolite content) was spray dried (an inlet temperature of 180° C. and an outlet temperature of 105° C.) to yield a free flowing gel powder.

Example 6

0.36 kg of a zeolite powder (Zeolyst™ CBV 300 obtained from Zeolyst International; pH 5 to 7) was added with stirring to 0.50 L of the cerium oxide colloidal dispersion (180 g/L of cerium oxide equivalent), made as described in Example 3. The thixotropic mixture (density 1.28 g/ml, pH 3.7) containing a nominal 33% by weight cerium oxide (based on the total equivalent cerium oxide and zeolite content) and 67% by weight zeolite (based on the total equivalent cerium oxide and zeolite content) was spray dried (an inlet temperature of 180° C. and an outlet temperature of 105° C.) to yield a free flowing gel powder.

Example 7

Different volumes of the cerium colloidal dispersion, made as described in Example 3, was stirred with different weights of a zeolite powder (Zeolyst™ CBV 720 obtained from Zeolyst International; pH 3 to 5). The mixture of the cerium colloidal dispersion and the zeolite powder yielded slurries covering the various compositions shown in Table 1.

TABLE 1

| Feed | Wt % Ceria[1] | Volume of Cerium Colloidal Dispersion (L) | Mass of Zeolite (g) | Total Volume (L) | Slurry Density (g/ml) | pH |
|---|---|---|---|---|---|---|
| 1 | 33 | 0.75 | 350 | 0.92 | 1.33 | 3.3 |
| 2 | 44 | 1.00 | 300 | 1.15 | 1.27 | 3.1 |
| 3 | 54 | 1.25 | 250 | 1.40 | 1.24 | 3.0 |
| 4 | 64 | 1.50 | 200 | 1.60 | 1.22 | 2.9 |
| 5 | 72 | 1.00 | 90 | 1.025 | 1.20 | 2.8 |

[1]The weight % was based on the total equivalent cerium oxide and zeolite content.

Spray Drying of Mixed Ceria Colloidal Dispersion-Zeolite Feeds

Example 8

All the feeds prepared from Example 7, easily pass through a 150 μm sieve. There are small quantities of tramp material (<1%). The feeds were allowed to stand for 24 hours at 22° C. prior to the spray drying. Feed 1 showed no evidence of sedimentation. Feeds 2 to 5 show sedimentation; however, the sediment was easily re-slurried by shaking or gentle stirring.

The spray drying of larger amounts of the feeds was carried out using a Mobile Minor spray dryer (nominal evaporative capacity, 5 kg water per hour). The feed rate to the spray dryer was 1.7 L/hour, the inlet temperature was 220° C. and the outlet temperature was 109° C. to 116° C. The feed was stirred while being sprayed. Table 2 shows the results of the spray drying.

TABLE 2

| Feed | Mass of Spray Dried Feed (kg) | Theoretical Yield of Gel Powder (kg) | Actual Yield of Gel Powder (kg) | % Recovery |
|---|---|---|---|---|
| 1 | 162.5 | 68.3 | 64.0 | 95 |
| 2 | 1.210 | 0.400 | 0.414 | 102[1] |
| 3 | 1.214 | 0.367 | 0.435 | 118[1] |
| 4 | 1.620 | 0.439 | 0.435 | 99 |
| 5 | 1.065 | 0.268 | 0.235 | 87 |
| Average % Recovery | | | | 100 |

[1]These yields are greater than 100% due to sequential reactions without washdown of the spray dryer.

The gel powders, as described in Table 2, are spherical and free-flowing. The gel powders were examined by thermogravimetric analysis to determine the preferred heat treatment temperature and then were subjected to heat treatment at 500° C. (the gel powder is heated at a rate of 100° C./hour until it reaches a temperature of 500° C., where the temperature is held for at least 1 hour), where weight loss and/or $NO_x$ emissions was observed. Assessment of these spray dried ceria-zeolite gel powders are given in Table 3.

TABLE 3

| Feed | Wt % Ceria[1] | Tap Density (g/ml) |
|---|---|---|
| 1 | 33 | 0.55 |
| 2 | 44 | 0.56 |

TABLE 3-continued

| Feed | Wt % Ceria[1] | Tap Density (g/ml) |
|---|---|---|
| 3 | 54 | 0.68 |
| 4 | 64 | 0.80 |
| 5 | 72 | 0.94 |

[1]The weight % was based on the total equivalent cerium oxide and zeolite content.

Since the density of ceria is much higher than the density of zeolite, the results of the experiment shown in Table 3 confirms that the ceria is with the ceria-zeolite gel powder; as the percent by weight ceria increases, the density increases.

Non-Leachable Ceria-Zeolite Gel Powders

Example 9

10.0 g of a ceria-zeolite gel powder (Zeolyst™ CBV 720 obtained from Zeolyst International; pH 3 to 5), prepared as described in Example 8 (except not heat treated at 500° C.) and containing 4.4 g of cerium oxide (44% by weight cerium oxide), was added to 100 ml of water and heated to 70° C. for approximately 10 minutes. This solution was then centrifuged and to the resulting clear supernatant (leach liquor) was added ammonium hydroxide, which precipitated any ceria dissolved in the supernatant. Only 0.35 g of ceria was found in the leach liquor.

Example 10

10.0 g of a ceria-zeolite gel powder (Zeolyst™ CBV 600 obtained from Zeolyst International; pH 3 to 5), similarly prepared as Example 5 (not heat treated at 500° C.) and containing 6.5 g of cerium oxide (65% by weight cerium oxide), was added to 50 ml of water and heated to 70° C. for approximately 10 minutes. The conductivity was measured and found to be $10 \times 10^{-3}$ Siemens.

Example 11

10.0 g of a ceria-zeolite gel powder (Zeolyst™ CBV 600 obtained from Zeolyst International; pH 3 to 5), similarly prepared as Example 5 (not heat treated at 500° C.) and containing 4.4 g of cerium oxide (44% by weight cerium oxide), was added to 50 ml of water and heated to 70° C. for approximately 10 minutes. The conductivity was measured and found to be $6.4 \times 10^{-3}$ Siemens.

Increased conductivity equates to more leaching of ceria, thus, Examples 10 and 11 show that with increased loadings of ceria, the conductivity seems to increase proportionately, which means more leaching of ceria. Although leaching increased with higher loadings, it has been found that, samples heat treated at temperatures less than about 200° C., typically, have less than 30% by weight of the cerium oxide (based on the total equivalent cerium oxide content) leach into water.

These examples exhibit a wide range of weight percentages of cerium oxide-coated zeolites. Experiments show an increasing correlation between high resultant densities of the cerium oxide-coated zeolites and higher loadings of cerium oxide. Surprisingly, the stability of these coated zeolites, even without heat treating the cerium oxide-coated zeolites above 500° C., is quite high, as recognized in Examples 9 to 11.

Although preferred embodiments of the invention have been described herein in detail, it will be understood by those skilled in the art that variations may be made thereto without departing from the spirit of the invention or the scope of the appended claims.

The invention claimed is:

1. A catalytic rare earth metal oxide-coated zeolite free-flowing bulk particulate comprising:
    a zeolite particulate material;
    a rare earth metal oxide;
    said zeolite particulate material having an average pore size of less than a particle size of said rare earth metal oxide; and
    greater than 20% by weight of said rare earth metal oxide coated on outer surfaces of said zeolite particulate material, based on the total equivalent rare earth metal oxide and zeolite content.

2. The free-flowing bulk particulate of claim 1, wherein the rare earth metal oxide is selected from the group consisting of oxides of lanthanide metals, yttrium, scandium and a mixture thereof.

3. The free-flowing bulk particulate of claim 2, wherein the rare earth metal oxide is an oxide of cerium.

4. The free-flowing bulk particulate of claim 3, wherein said cerium oxide coated on the outer surface is in the range of 20 to 70% by weight based on the total equivalent cerium oxide and zeolite content.

5. The free-flowing bulk particulate of claim 3, wherein the zeolite is represented by the formula $$M_m M'_n M''_p [aAlO_2 \cdot b\ SiO_2 \cdot cTO_2]$$

wherein
    M is a monovalent cation,
    M' is a divalent cation,
    M" is a trivalent cation,
    a, b, c, n, m, and p are numbers which reflect the stoichiometric proportions,
    c, m, n or p can also be zero,
    Al and Si are tetrahedrally coordinated Al and Si atoms, and
    T is a tetrahedrally coordinated metal atom being able to replace Al or Si,
    the ratio of b/a of the zeolite or the zeolite-like material, has a value >5 and the micropore size of the zeolite is within the range of 5 to 13 Å.

6. The free-flowing bulk particulate of claim 3, wherein the zeolite is selected from the group consisting of silicalite zeolites, faujasites, X, Y and L zeolites, β-zeolites, Mordenite zeolites and ZSM zeolites and a mixture thereof.

7. The free-flowing bulk particulate of claim 2, wherein said lanthanide metal oxide coated on the outer surface is in the range of 20 to 70% by weight based on the total equivalent cerium oxide and zeolite content.

8. The free-flowing bulk particulate of claim 2, wherein the zeolite is represented by the formula $$M_m M'_n M''_p [aAlO_2 \cdot b\ SiO_2 \cdot cTO_2]$$

wherein
    M is a monovalent cation,
    M' is a divalent cation,
    M" is a trivalent cation,
    a, b, c, n, m, and p are numbers which reflect the stoichiometric proportions,
    c, m, n or p can also be zero,
    Al and Si are tetrahedrally coordinated Al and Si atoms, and
    T is a tetrahedrally coordinated metal atom being able to replace Al or Si, the ratio of b/a of the zeolite or the zeolite-like material, has a value of about >5 to about 300 and the micropore size of the zeolite is within the range of 5 to 13 Å.

9. The free-flowing bulk particulate of claim 2, wherein the zeolite is selected from the group consisting of silicalite zeolites, faujasites, X, Y and L zeolites, β-zeolites, Mordenite zeolites and ZSM zeolites and a mixture thereof.

10. The free-flowing bulk particulate of claim 1, wherein said rare earth metal oxide coated on the outer surface is in the range of 20 to 70% by weight based on the total equivalent rare earth metal oxide and zeolite content.

11. The free-flowing bulk particulate of claim 1, wherein the particulate comprises particle sizes in the range of 1 to 25 microns.

12. The free-flowing bulk particulate of claim 1, wherein said free flowing bulk particulate is nitrate ion-free.

13. The free-flowing bulk particulate of claim 1, wherein said zeolite particulate material has a pore diameter less than 10 Å.

14. The process of claim 1, wherein the zeolite is represented by the formula

$$M_m M'_n M''_p [aAlO_2 \cdot b\ SiO_2 \cdot cTO_2]$$

wherein

M is a monovalent cation,

M' is a divalent cation,

M" is a trivalent cation, a, b, c, n, m, and p are numbers which reflect the stoichiometric proportions, c, m, n or p can also be zero, Al and Si are tetrahedrally coordinated Al and Si atoms, and T is a tetrahedrally coordinated metal atom being able to replace Al or Si, the ratio of b/a of the zeolite or the zeolite-like material, has a value of about 5 to about 300 and the micropore size of the zeolite is within the range of 5 to 13 Å.

15. The free-flowing bulk particulate of claim 1, wherein the zeolite is selected from the group consisting of silicalite zeolites, faujasites, X, Y and L zeolites, β-zeolites, Mordenite zeolites and ZSM zeolites and a mixture thereof.

16. The free-flowing bulk particulate of claim 1, wherein the zeolite is selected from the group consisting of hydrophobic, mildly hydrophobic zeolites, and a mixture thereof, which have an affinity for hydrophobic and mildly hydrophobic organic compounds.

17. The free-flowing bulk particulate of claim 1, wherein said zeolite particulate material has a pH of less than 4.2.

18. The free-flowing bulk particulate of claim 1, wherein less than 30% by weight of the rare earth metal oxide (based on the total equivalent rare earth metal oxide content) is found to leach into water when the rare earth metal oxide-coated zeolite free-flowing bulk particulate is slurried in water.

19. The free-flowing bulk particulate of claim 1, wherein less than 30% by weight of the cerium oxide (based on the total equivalent cerium oxide content) is found to leach into water when the cerium oxide-coated zeolite free-flowing bulk particulate is slurried in water.

20. The free-flowing bulk particulate of claim 1, wherein said average pore size is less than 20 Å.

* * * * *